Oct. 27, 1970   W. A. BAEHRLE, JR   3,535,810
TAG FASTENER
Filed June 27, 1968

INVENTOR
WILLIAM A. BAEHRLE, Jr.

BY
*Busser, Smith & Harding*

ATTORNEYS

United States Patent Office 3,535,810
Patented Oct. 27, 1970

3,535,810
TAG FASTENER
William A. Baehrle, Jr., 22 Wayland Road,
Berwyn, Pa. 19312
Filed June 27, 1968, Ser. No. 740,545
Int. Cl. G09f 3/12
U.S. Cl. 40—26                                6 Claims

ABSTRACT OF THE DISCLOSURE

A fastener for securing tags to wire and the like comprises a single section of spring wire bent to form a normally open but closable loop, and having interengaging hooks formed on either end, the arrangement requiring special manipulations for opening thereof, preventing accidental opening.

Background of the invention

This invention relates to tag fasteners, and particularly to fasteners of a type suitable for use in fastening identifying tags to wire during its manufacture.

During the manufacture of wire, beginning with rather heavy coils of considerable length, various stages of drawing, heat treating and annealing take place, during which it is necessary to identify the various coils, and to provide information concerning the alloy, treatments, etc. Ordinarily, this information is provided on metal tags, which are fastened to a turn of a coil of wire.

Various fasteners have been used for this purpose. None has been satisfactory from a standpoint of reliability, and the loss of identifying tags occurs frequently as a result of failure of the fastener. Some fasteners work themselves loose during transportation of wire coils from one place to another, and others become disengaged during heat treatment as a consequence of the loss by the fastener of its spring characteristics.

Summary of the invention

The object of this invention is to provide a tag fastener which may be attached easily to a turn of wire in a coil, but which resists accidental dislocation. In accordance with the invention, this object is accomplished by providing a fastener having inter-engaging hooks arranged in such a way that special and unusual relative movements of the hooks are necessary to effect their disengagement.

A further object is to provide a fastener which is capable of being applied to a turn of wire on a coil by an operation involving the use of only one hand of a worker.

Other objects will be apparent from the following description read in conjunction with the accompanying drawings.

Description of the preferred embodiment

Figure 1:
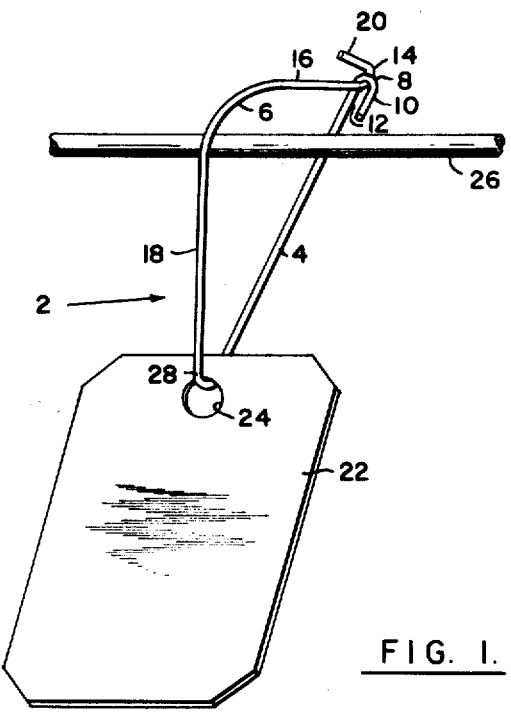
FIG. 1 is a perspective view of a fastener in accordance with the invention, showing the manner in which it fastens an identifying tag to a section of wire.

Referring to FIG. 1, a fastener, generally indicated at 2 is shown as comprising a loop of wire consisting of a substantially straight portion 4 and a loop portion 6. Portion 4 terminates in a hook 8, the end portion 10 of which extends for a short distance in substantial parallelism with portion 4 to provide a space 12. Loop portion 6 lies in a plane perpendicular to the plane in which hook 8 lies. Hook 14 of portion 6 extends through space 12 and underneath the curve of hook 8. A spring characteristic of the wire from which fastener 2 if formed tends to cause portions 4 and 6 to separate from each other, resulting in a tight engagement of hooks 8 and 14. Loop 6 consists of two portions 16 and 18. The spring characteristic of the wire likewise causes portion 16 of loop 6 to separate from portion 18, and this causes portion 16 to be urged into space 12. End 20 of hook 14 is not parallel to portion 16, but forms an acute angle therewith, and it will be seen that this permits relatively easy engagement of the hooks.

A metal tag 22 is perforated at 24, and the wire of fastener 2 passes through the perforation. A section 26 of wire is shown passing through the closed loop formed by fastener 2.

Figure 2:
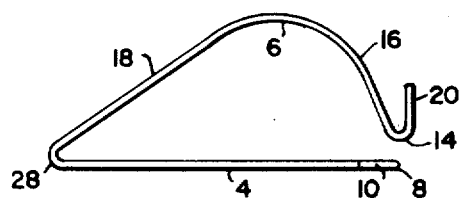
FIG. 2 is an elevation of the fastener in its open position.
Figure 3:
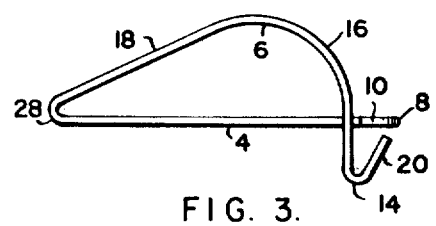
FIG. 3 is an elevation of the fastener in an intermediate position between its engaged and disengaged position.
Figure 4:
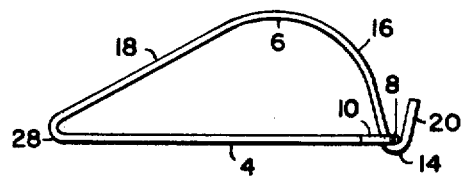
FIG. 4 is an elevation of the fastener in its engaged position.

Referring now to FIGS. 2, 3 and 4, in that order it will be apparent that these figures represent successive steps in attaching the fastener to a loop of wire on a coil.

In FIG. 2, the fastener is shown in its normal opened position. There is a space between hooks 8 and 14, through which wire section 26 can pass. Even if the thickness of the wire section is greater than the distance between the hooks, a pushing of the fastener towards the wire will cause hook 14 to move upwardly so that the wire section passes easily through the space. The fastener, therefore, can be easily attached to a section of wire by the use of only one hand. The next step involves the exertion of downward and inward pressure on the portion 16, which may be accomplished by holding the fastener between the thumb and fingers, portion 4 of the fastener resting on the fingers and the thumb forcing portion 16 downwardly and inwardly. Portion 20 of hook 14 slides against the inside of hook 8 until the end of portion 20 clears hook 8 as shown in FIG. 3. At this time, portion 20 snaps outwardly (toward the right in FIG. 3), and beyond hook 8, so that when the pressure of the thumb and finger is released, the fastener will snap to the closed position illustrated in FIGS. 1, 4, and 6.

Figure 5:
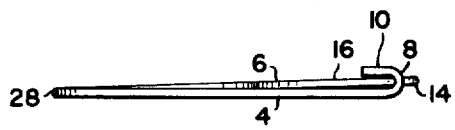
FIG. 5 is a bottom view of the fastener as shown in FIG. 2.
Figure 6:
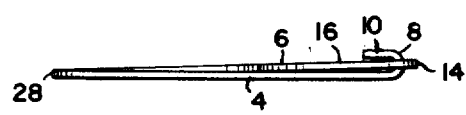
FIG. 6 is a bottom view of fastener as shown in FIG. 4.

Referring to FIGS. 5 and 6, the fact that portions 4 and 6 of the fastener are not in vertical alignment with each other will be apparent. The bend at 28 is desirably such that hook 14 is centered on the opening at 12, so that movement of portion 16 to the side is not necessary in order to close the fastener.

Referring now to FIGS. 2, 3 and 4 in reverse order it will be apparent that the necessary steps for releasing the engagement of hooks 8 and 14 involve first the exertion of a downward pressure on portion 16 to bring the end of portion 20 below hook 8. Following this, portion 16 is forced toward the left to bring the fastener into the configuration illustrated in FIG. 3 so that the end of portion 20 clears hook 8 and can pass upwardly through opening 12. The important requirement for opening the fastener, and involving a movement which would not ordinarily occur in the absence of an intention on the part of the worker to open the fastener, is the requirement that pressure toward the left be maintained on portion 16 while downward pressure is released. Unless this pressure is maintained, the fastener will return to the configuration shown in FIG. 4. The fastener is not likely to be released by jarring or by forces exerted by other turns of wire on the coil, because none of these circumstances is likely to involve the maintenance of pressure on portion 16 toward the left while downward pressure on 16 is released. Intentional release of the fastener, however, can be effected easily, and with the use of only one hand.

It will be apparent that even if the fastener loses its spring characteristics during heat treating, it is still very unlikely to become released accidentally.

I claim:
1. A fastener formed from a piece of wire having spring properties comprising a loop formed in the wire having a pair of separable ends, the spring properties being such that the ends are separated when the loop is in a relaxed condition to provide a free opening to the interior of said loop, a first bend formed in the wire at a first one of the ends of said loop and a first element of the wire connected by the first bend to the adjacent part of the loop, said bend and said first element forming a hook lying substantially in a first plane, a second bend formed in the wire at the opposite end of the loop and a second element of the wire connected by said second bend to the loop, the second element extending along but separated from the part of the loop adjacent said second bend, the second element, the second bend and the last-mentioned part of said loop defining an opening capable of receiving the part of the loop adjacent the first bend, the first bend and said first element simultaneously without deformation of either bend, and capable of retaining said part of the loop adjacent the first bend, and allowing the first and second bends to be brought into engagement with each other, the spring properties of the wire loop also being such that the bends are urged into engagement with each other when the ends of said loop are engaged, and the element connected to the said first bend is normally held in a position such that, for disengagement of said ends of said loop, there is required movement of one of said ends in a first direction with respect to the other against the spring force of said loop, followed by movement of said one of said ends with respect to the other in a second direction against the spring force of the loop with simultaneous maintenance of a force urging said one of said ends in said first direction, followed by movement of said one of said ends with respect to the other in a direction opposite to said first direction with simultaneous maintenance of a force urging said one of said ends in said second direction.

2. A fastener according to claim 1 in which said loop lies substantially in said first plane.

3. A fastener according to claim 1 in which said loop lies substantially in said first plane and in which said first element lies outside said loop.

4. A fastener according to claim 1 in which said second element and the said part of the loop adjacent the second bend define a plane transverse to said first plane.

5. A fastener according to claim 1 in which said first element is disposed at an angle with respect to the adjacent part of said loop such that it is engaged by and cammed by the inside of said second bend against the spring force of said loop when the ends of said loop are moved into engagement with each other from said relaxed condition.

6. A fastener according to claim 1 in which the end of said second element opposite said second bend is separated from the adjacent part of said loop by a distance sufficient to allow free passage of the part of said loop adjacent the first bend through the separation.

References Cited
UNITED STATES PATENTS

| | | | |
|---|---|---|---|
| 1,195,268 | 8/1916 | Riefsnyder | 40—26 |
| 1,467,931 | 9/1923 | Grace | 40—26 |
| 1,514,910 | 11/1924 | Kane | 40—26 |

EUGENE R. CAPOZIO, Primary Examiner

W. J. CONTRERAS, Assistant Examiner

U.S. Cl. X.R.

24—261